F. A. BREWSTER.
Assignor to himself and J. W. LABAREE.
Hoop-Skirt.
No. 8,040. Reissued Jan. 15, 1878.
Fig. I
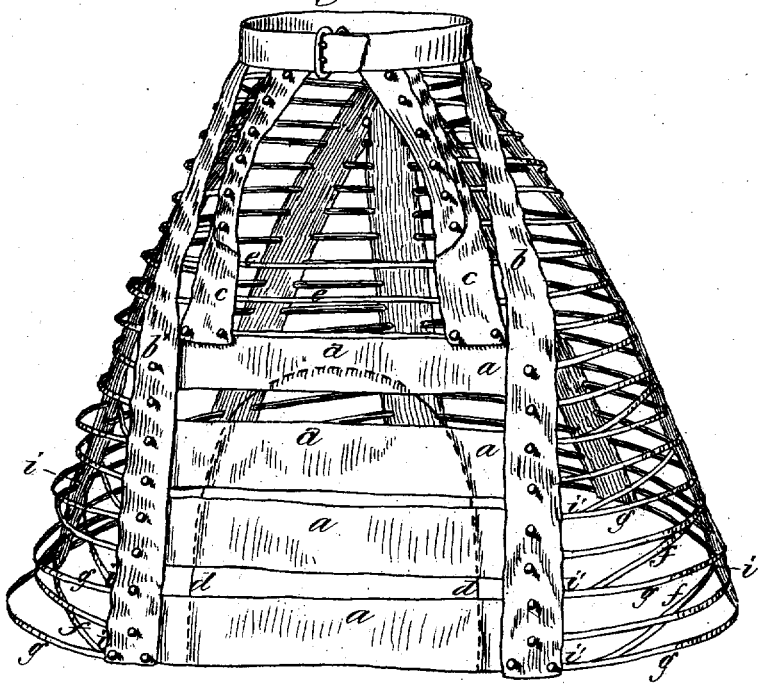
Witnesses—
C. E. Burstland.
W. C. Taylor.
Francis A. Brewster
By T. Alentis, his Atty.
Inventor.
N. PETERS, PHOTO-LITHOGRAPHER, WASHINGTON, D. C.

UNITED STATES PATENT OFFICE.

FRANCIS A. BREWSTER, OF BRUNSWICK, GEORGIA, ASSIGNOR TO HIMSELF AND JOHN W. LABAREE.

IMPROVEMENT IN HOOP-SKIRTS.

Specification forming part of Letters Patent No. 67,158, dated July 30, 1867; Reissue No. 8,040, dated January 15, 1878; application filed December 8, 1877.

*To all whom it may concern:*

Be it known that I, FRANCIS A. BREWSTER, of Brunswick, in the county of Glynn and State of Georgia, have invented a new and useful Improvement in Hoop-Skirts; and I do hereby declare that the following is a full, clear, and exact description thereof, reference being had to the accompanying drawing, making a part of this specification, and to the letters of reference marked thereon.

The nature of my invention consists in the construction of a hoop-skirt made from the ordinary skirt-wire, tapes, and other usual materials, of the same contour and general appearance as the ordinary hoop-skirts now in use, but which can be drawn or pressed into a smaller compass about the person of the wearer, if necessary, and if not so pressed or folded will maintain its full size, and answer every use of the ordinary hoop-skirt in expanding the clothing.

My invention, therefore, relates to the manner of constructing a hoop-skirt which, in addition to the ordinary uses and properties of the article, can also be contracted in size, or folded into a less space, whenever the convenience of the wearer may require, as in sitting down, or in ascending or descending a staircase, or moving along a crowded street.

The figure is a perspective view of said improved hoop-skirt.

The construction of my invention is as follows: The upper part of the skirt is constructed in the usual manner, with suspending-tapes descending from a waistband, and tempered and flattened wire, generally called "springs," and wound or coated with twine or other covering, running around or partly around the skirt, and fastened to the suspending-tapes by clamps, rivets, or other means of securing them. A few of the upper wires do not generally pass entirely around the skirt, but stop short of, joining at the ends, so that an opening is left in front, immediately below the waistband. The remainder of the wires or springs pass entirely around the skirt in most forms of construction.

In my method of forming a hoop-skirt, the wires in the lower part of the skirt do not extend entirely around the skirt; but the ends are secured in the suspending-tapes *b b'*. I do not limit myself as to the number of wires *e e e* which run entirely around the skirt, or to the number of wires *g g* employed to pass from *b* around to *b'*, as the same will vary with the size and purpose of each skirt; but I propose to apply the springs *g g*, which run from *b* to *b'*, around the rear of the skirt, for the distance of about one-half of the height of the skirt.

As the ends of the springs *g g* are fastened in the tapes *b b'*, I connect the tapes *b* and *b'* by other tapes or bands, *a a a a*, running in the same direction as the wires or springs *g g e e*.

I have substituted for the bands *a a* a rectangular piece of thin cloth, which serves about the same purpose as the bands, in preventing the lower part of the tapes *b b'* from flying apart by the action of the springs.

The semi-elliptical spring *d d*, made of common hoop-skirt wire, is sewed or clamped to the bands *a a a a*, as shown, and serves to give the portion of the skirt formed by the bands *a a* the proper tension and elasticity.

To preserve the circular form of the skirt I also find it necessary to apply short pieces of skirt-wires *f f f* to the springs *g g g*, or to a portion of them, these smaller pieces being clamped to the main springs *g g* at *i i'*, and adjusted to the springs *g g*, so as to obviate the tendency of the latter to straighten.

The main points of novelty in my invention, as applied to hoop-skirts of the usual form, are the substitution in the lower portion of the skirt, for continuous springs running entirely around the skirt, of springs *g g*, running from *b* to *b'*, as shown; the application to the space left in the front of the skirt between the opposite ends of the springs *g g* of the bands *a a a a*, or the equivalent strip of cloth; the use of the semi-elliptical spring *d d*, as shown, and the use of the short springs or ties *f f* on each side of the skirt.

As hoop-skirts are made of many degrees of strength, and adapted for the varying uses of different wearers, I am unable to give in detail a method of constructing my invention which shall apply without change in every instance.

I prefer to apply the short springs *f f* to every alternate spring *g*, but for heavy skirts may be forced to apply a short spring, *f*, to every spring in the lower part of the skirt. In like manner it may be necessary to insert one or more additional springs, *d d*, in a heavy skirt, and the application of the short springs *f f* and of the semi-elliptical springs *d d* must be made with a view to preserve the elasticity and the circular form of the skirt.

I am aware that an opening has been left in the lower part of the front of hoop-skirts to accommodate the feet in walking, as is set forth in the Letters Patent granted to Thomas B. De Forest on the 2d day of April, 1861, for improvement in skirts; and I do not claim the formation of such an opening, and the same is closed in my improved skirt by means of the bands *a a*, or the equivalent strip of cloth, and I disclaim as my invention the method of constructing hoop-skirts set forth in said Letters Patent.

Having described my invention, what I claim as new, and desire to secure by Letters Patent, is—

1. The combination, in a hoop-skirt, of springs extending around the back only of the same, with bands of textile fabric extending across the front, and tapes running up and down for the attachment of the ends of said springs and bands, substantially as set forth.

2. The springs extending from the tape *b* around the skirt to the tape *b'*, in combination with the bands *a*, and one or more semi-elliptical springs, *d*, the whole constructed substantially as and for the purpose set forth.

3. In a hoop-skirt divided wholly or partially down the front, the auxiliary ribs or tie-springs *f f*, arranged to operate substantially as and for the purpose herein set forth.

FRANCIS A. BREWSTER.

Witnesses:
E. A. NELSON,
WM. B. C. COKER.